United States Patent
Amini et al.

(10) Patent No.: US 6,615,360 B1
(45) Date of Patent: Sep. 2, 2003

(54) METHOD AND SYSTEM FOR CONTROLLING A POWER ON SEQUENCE IN RESPONSE TO MONITORING RESPECTIVE COMPONENTS OF A COMPUTER SYSTEM WITH MULTIPLE CPU SOCKETS TO DETERMINE PROPER FUNCTIONALITY

(75) Inventors: Kamran Amini, Cary, NC (US); Robert Joseph Evans, Cary, NC (US); Henry Gaines McMillan, Raleigh, NC (US); Robert Matthew Piper, Raleigh, NC (US); Michael Leo Scollard, Raleigh, NC (US); Paul Maylon Smith, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/491,030

(22) Filed: Jan. 25, 2000

(51) Int. Cl.⁷ .............................. G06F 1/26; G06F 1/28; G06F 1/30; G06F 15/177
(52) U.S. Cl. ....................... 713/330; 713/300; 713/310; 713/340; 713/1; 713/2
(58) Field of Search ................................. 713/330, 340, 713/300, 1, 2, 310; 710/8; 700/2

(56) References Cited

U.S. PATENT DOCUMENTS

| | | | |
|---|---|---|---|
| 4,885,683 A | | 12/1989 | Coogan |
| 5,121,500 A | * | 6/1992 | Arlington et al. ............ 713/330 |
| 5,357,519 A | | 10/1994 | Martin et al. |
| 5,473,499 A | * | 12/1995 | Weir .......................... 713/300 |
| 5,491,790 A | | 2/1996 | Keeley et al. |
| 5,546,563 A | * | 8/1996 | Chuang ........................ 703/27 |
| 5,675,772 A | * | 10/1997 | Liu et al. ..................... 703/27 |
| 5,692,189 A | * | 11/1997 | Lipe .............................. 713/1 |
| 5,781,774 A | * | 7/1998 | Krick ............................. 713/1 |
| 5,802,328 A | * | 9/1998 | Yoshimura .................. 710/301 |
| 5,834,856 A | * | 11/1998 | Tavallaei et al. ............... 714/1 |
| 5,881,282 A | * | 3/1999 | Shipman ....................... 713/2 |
| 5,953,502 A | | 9/1999 | Helbig, Sr. |
| 6,237,103 B1 | * | 5/2001 | Lam et al. ................... 713/300 |
| 6,327,663 B2 | * | 12/2001 | Isaac et al. ................. 713/300 |
| 6,330,622 B1 | * | 12/2001 | Schaefer ........................ 710/8 |
| 6,442,746 B1 | * | 8/2002 | James et al. .................. 716/14 |

FOREIGN PATENT DOCUMENTS

JP 63274325 A * 11/1988 ............ H02H/7/20

OTHER PUBLICATIONS

Krishnamurthy, M.; Efstathiou, H.J.; "Monitoring and fault diagnosis using qualitative reasoning" Qualitative Modelling in Diagnosis and Control, IEE Colloquium on, Jan. 8/ 1988 pp.: 2/1–2/5.*

* cited by examiner

Primary Examiner—Thomas Lee
Assistant Examiner—James K. Trujillo
(74) Attorney, Agent, or Firm—Bracewell & Patterson LLP

(57) ABSTRACT

A method of controlling the power-on of a computer system by providing a plurality of monitor lines interconnected with respective components of the computer system, monitoring the lines using a control circuit in response to a power-on reset signal, and executing a system power-on sequence in response to a determination by the control circuit that the components of the computer system are functioning properly. If the computer system has a plurality of CPU slots, the control circuit determines if a CPUs or terminator cartridges is plugged into the CPU slots, and determines that a properly matched CPU has been installed into the system, and that multiple CPUs contain compatible power supply requirements. Finally, the control circuit can determine that a power regulator is functioning properly.

14 Claims, 4 Drawing Sheets

METHOD AND SYSTEM FOR CONTROLLING A POWER ON SEQUENCE IN RESPONSE TO MONITORING RESPECTIVE COMPONENTS OF A COMPUTER SYSTEM WITH MULTIPLE CPU SOCKETS TO DETERMINE PROPER FUNCTIONALITY

BACKGROUND OF THE INVENTION

1. Field of the Invention

The present invention generally relates to computer systems, specifically to a method and system for controlling the powering up of a computer system and its components, and more particularly to a method of monitoring the state of a computer system during power-up.

2. Description of Related Art

The basic structure of a conventional computer system includes one or more processing units which are connected to various peripheral devices, including input/output (I/O) devices such as a display monitor, keyboard, graphical pointer (mouse), and a permanent storage device or hard disk, and a memory device (such as random access memory or RAM) that is used by the processing units to carry out program instructions. Computers also have firmware, referred to as read-only memory (ROM) or read-only storage (ROS), whose primary purpose is to seek out and load an operating system from one of the peripherals (usually the permanent memory device) whenever the computer is first turned on.

Processing units communicate with the peripheral devices by various means, including a generalized interconnect or bus, or direct memory access channels. A computer system may have many additional components such as serial, parallel, and universal system bus (USB) ports for connection to, e.g., modems, printers or scanners. There are other components that might be used in conjunction with the foregoing components; for example, a display adapter might be used to control a video display monitor, a memory controller can be used to access the system memory device, etc.

Conventional computer systems often allow the user to add or remove various components after delivery from the factory. For peripheral devices, this can be accomplished using an "expansion" bus, such as the Industry Standard Architecture (ISA) bus or the Peripheral Component Interconnect (PCI) bus. Another component that is commonly added by the user is main memory. This memory is often made up of a plurality of memory modules that can be added or removed as desired.

Even processing units can be added or swapped out, in more recent computer designs. A plurality of processing clusters can be connected by respective processor buses to a system bus. Each processing cluster is adapted to receive a plurality of individual processors. A given processor is physically mounted on a processor board, and electrically connected to various leads on the board, using a socket. For example, each processing cluster may be, a processor quad, that is, having four sockets and so receiving a maximum of four processors.

A computer's operating system (OS) can be adapted to utilize several processors in carrying out program instructions. The OS selects one of the plurality of processors to be a service processor, primarily dedicated to dispatching tasks and managing information relating to the basic functioning of the operating system itself, such as handling device drivers and features of the graphical user interface (GUI) that is employed to present information to the user, and allow the user to input system commands.

The OS also uses the service processor to distribute program instructions among the other processors.

Expansion buses such as the ISA and PCI buses were originally very limited, in that the entire computer system had to be powered down before any peripheral device could be added to or removed from a PCI adaptor slot, and then powered up again (rebooted) to properly initialize the operating system and any new peripheral device. More recently, computer hardware components such as "hot-pluggable" PCI adapters have been devised that can be added or removed from a computer system while the system is fully operational, without any service interruption. Each PCI adapter slot along the PCI bus has a separate power line, a separate reset line, and a switch connecting the slot to the PCI bus, allowing the slot to be electrically isolated from the PCI bus, and reactivated after insertion of a new PCI device into the slot.

Voltage regulator modules (VRMs) are used to produce the required power sources/references for the various computer components at precise voltages. While processors and system RAM can be added or swapped out in some conventional systems, these systems must still typically be powered down for VRM upgrades or service.

Considering the complexity of powering up these various components, and given the many subassemblies, cables, and connections contained in current systems, it is very easy for a problem to arise in the supply of power to a computer system. If any of these items is improperly assembled, the computer system may power on in a semi-functional, or undefined, state. This condition may cause an unknown loss of data integrity, or even damage to parts of the system. The prior art is inadequate in providing a means for checking the states of the various parts of a computer system before allowing the system to power-on.

In light of the foregoing, it would be desirable to provide an improved method of checking a computer system before a power-on. It would be further advantageous if the method could be implemented in a compact structure located on the system motherboard, and leverage existing structures and components in order to minimize cost and design complexity.

SUMMARY OF THE INVENTION

It is therefore one object of the present invention to provide an improved computer system.

It is another object of the present invention to provide a computer system having improved control over the power-on of the various computer components.

It is yet another object of the present invention to provide a method of monitoring the state of computer components for gating power-on control.

The foregoing objects are achieved in a method of controlling the power-on of a computer system, generally comprising the steps of providing a plurality of monitor lines to respective components of the computer system, interconnecting the monitor lines to a logic control circuit, monitoring the monitor lines using the logic control circuit in response to a power-on reset signal, and executing a system power-on sequence in response to a determination by the logic control circuit that the components of the computer system are functioning properly. In the embodiment wherein the computer system has a plurality of CPU slots which may receive a system CPU or a terminator cartridge, the logic control circuit determines that one of the system CPUs or terminator cartridges is plugged into each of the CPU slots. The logic control circuit can further determine that a properly matched CPU cartridge has been installed into the system, and that multiple CPUs contain compatible power supply requirements. The logic control circuit can also determine that the main power supply has been properly connected to the system motherboard, and that all daughter cards are properly installed on the motherboard and power supply connections to the daughter cards have been properly installed. Finally, the logic control circuit can also determine that a power regulator (such as a voltage regulator module or on-cartridge power regulator) is functioning properly.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
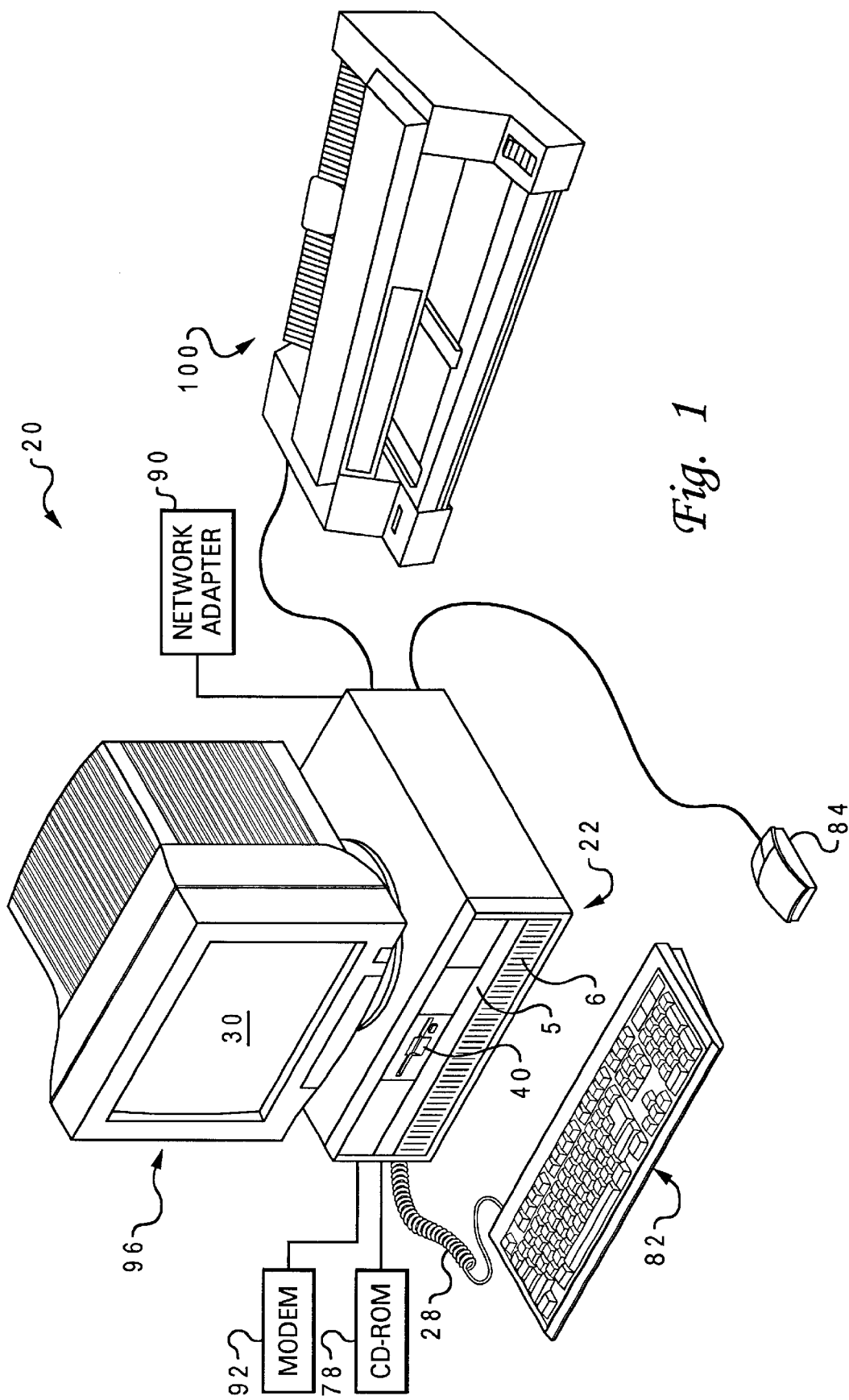
FIG. 1 is a illustration of one embodiment of a data processing system in which the present invention can be practiced.

With reference to FIG. 1, one embodiment of a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 2:
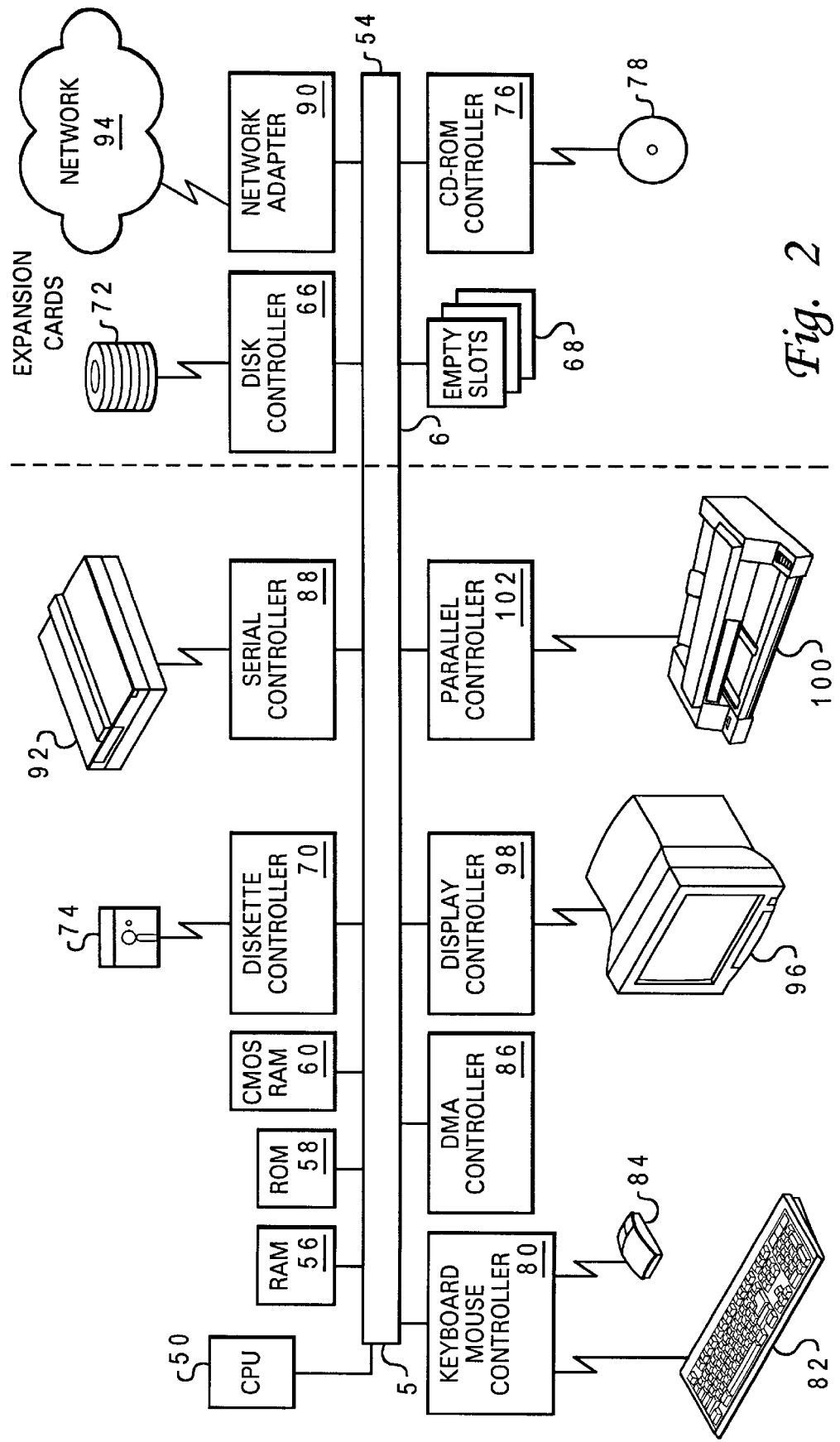
FIG. 2 is an high-level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the central processing unit (CPU) 50 to cause data processing system 20 to do work.

Memory devices coupled to system bus 5 include random access memory (RAM) 56, read only memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to.data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

Figure 4:
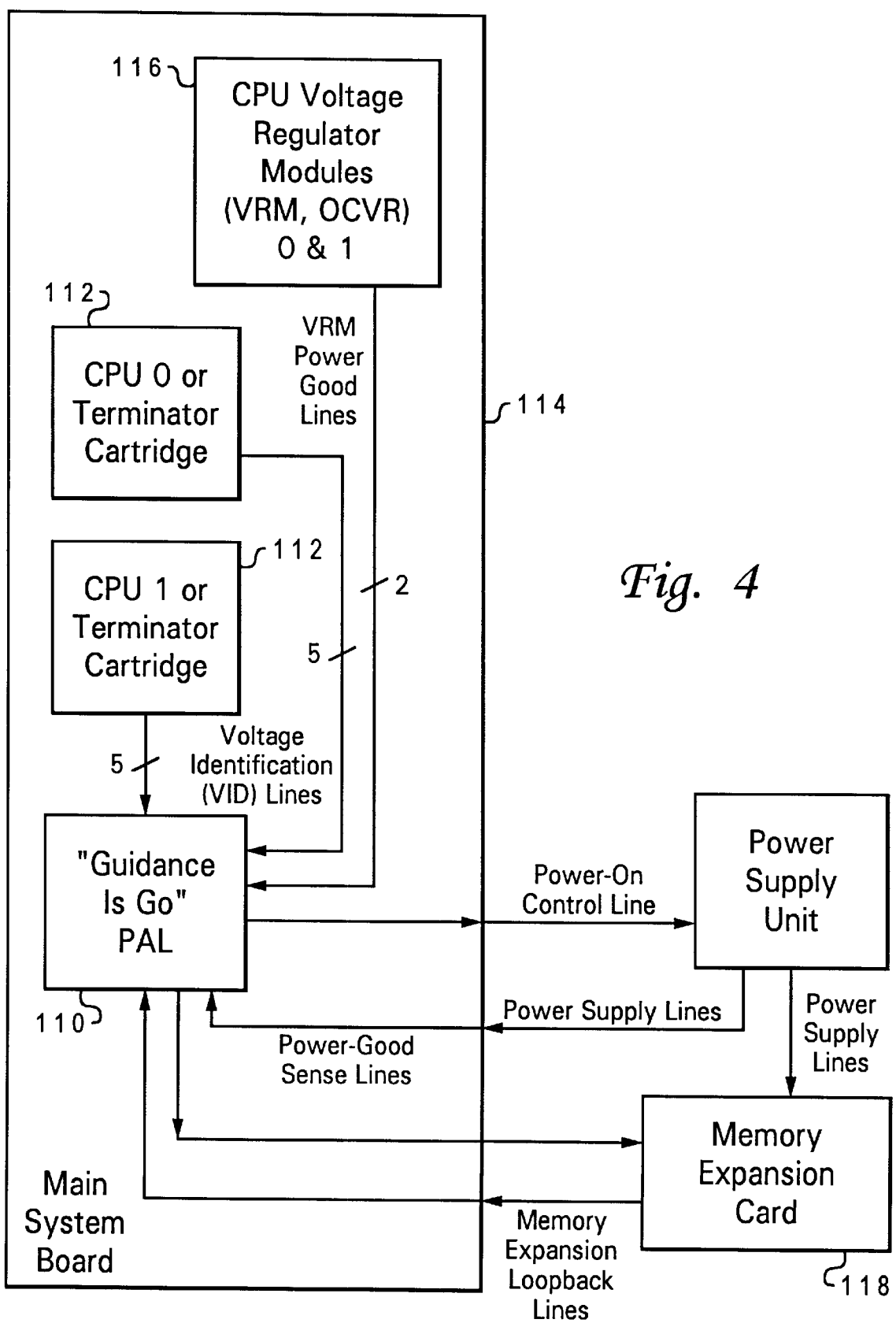
FIG. 4 is a block diagram of the logic control circuit of FIG. 3 interconnected with various computer components, some of which are mounted on the system motherboard, and others of which are provided off-board.

CPU 50 fetches, decodes, and executes instructions, and transfers information to and from other resources via the computers main data-transfer path, system bus 5. The PowerPC™ processor made by IBM may be used for CPU 50. System bus 5 connects the components in a data processing system 20 and defines the medium for data exchange. System bus 5 connects together and allows for the exchange of data between memory units 56, 58, and 60, CPU 50, and other devices as shown in FIG. 4. Those skilled in the art will appreciate that a data processing system constructed in accordance with the present invention may have multiple components selected from the foregoing, including even multiple processors.

Figure 3:
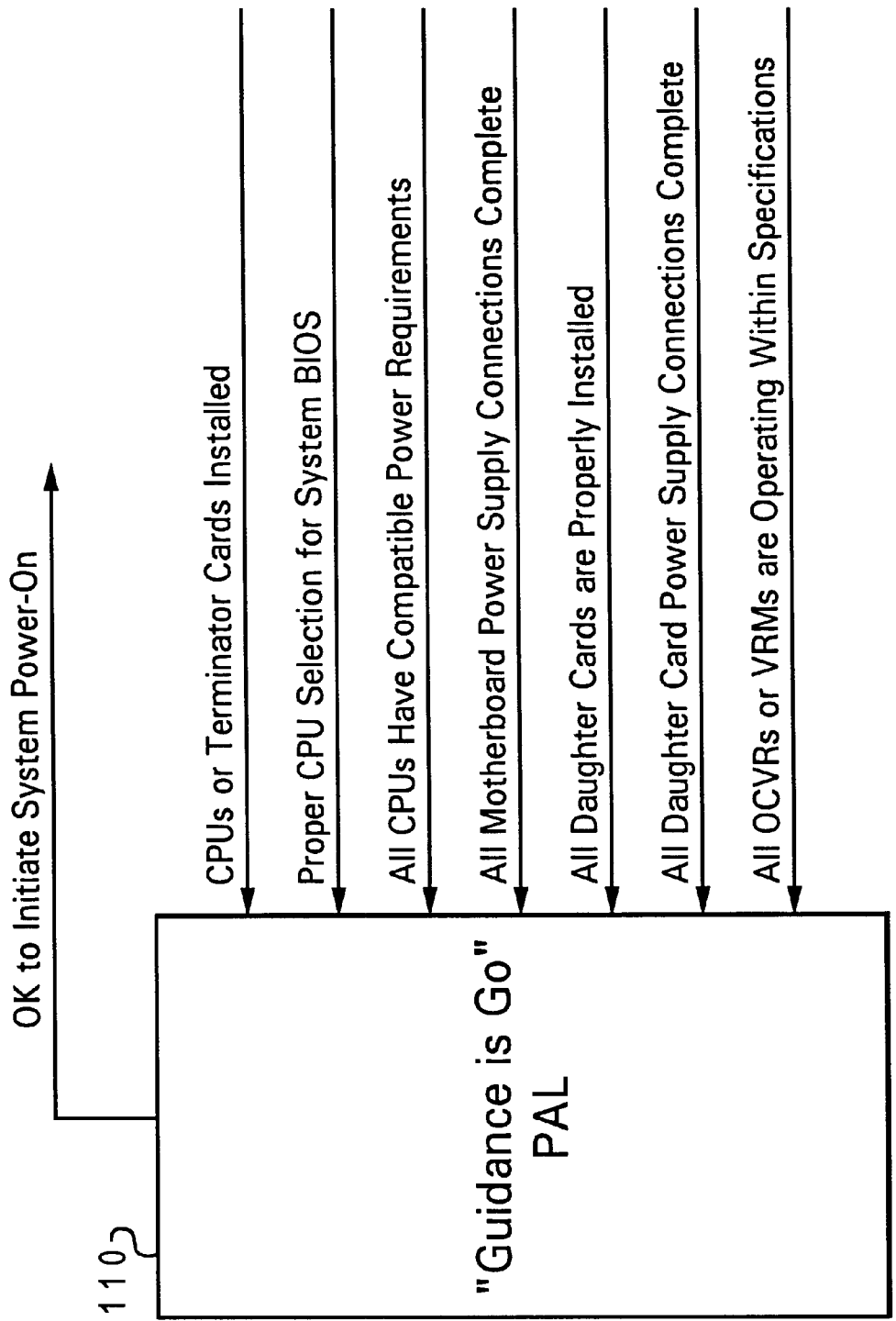
FIG. 3 is a schematic diagram of inputs to a logic control circuit used it accordance with one embodiment of the present invention.

Referring now to FIG. 3, one embodiment of the present invention allows data processing system 20 to check the states of the various parts of the system before allowing the system to power-on in response to a power-on reset (POR) signal. The logic function is implemented in a programmable array logic (PAL) device 110, preferably located on the system motherboard. Device 110 is referred to herein as the "Guidance-Is-Go PAL", or GIG PAL. GIG PAL 110 is appropriately programmed to check several features of the system. These checks preferably ensure that: (i) a system CPU or terminator cartridge is plugged into each CPU slot; (ii) a properly matched CPU cartridge as been installed into the system; (iii) multiple CPUs contain compatible power supply requirements; (iv) the main power supply has been properly connected to the system motherboard; (v) all daughter cards are properly installed; (vi) the power supply connections to any of the daughter cards have been properly installed; and (vii) the CPU on-cartridge power regulator (OCVR) or voltage regulator module (VRM) is properly installed and functioning. When all these conditions are valid, then the system power-on sequence is allowed to proceed.

With further reference to FIG. 4, device 110 ensures that a system CPU or terminator cartridge is plugged into each CPU slot 112. The computer system may support one or multiple CPU cartridges that plug into the motherboard 114. If the user chooses to not use the full CPU capability of the system, a CPU terminator card is to be installed in any of the empty slots. If these terminator cards are not installed, the signal quality on the CPU bus will be severely degraded, which can result in data loss on the CPU bus, possibly transparently to the user (or the system may not function at all). Current CPU and terminator cartridges used in most PCs contain a logic line, which indicates the presence of either cartridge. This logic-level line is routed through the CPU connector and on to GIG PAL 110. The proper state of this GIG PAL input indicates that either a CPU or terminator cartridge occupies all of the CPU slots.

There are many CPUs for use in current PC systems which occupy the same physical cartridge shell and connector. These CPUs differ in clock speeds, data/address sizes, cache sizes, and several other features. There is a set of system BIOS code/commands, contained in a programmable logic device on each motherboard, which are customized to each combination of CPU feature. If a CPU cartridge is plugged into a motherboard that does not contain the proper BIOS support code, improper system function may result. Current PC CPU cartridges contain five logic-level, identification lines that indicate a unique numerical pattern for each type of CPU. These are called voltage ID (VID) lines. GIG PAL 110 checks these lines to ensure that the digital number encoded by these five logic lines matches a CPU for which there is proper code contained in the motherboard system BIOS. The proper state of this GIG PAL input indicates that each of the installed CPU cartridges is supported by the motherboard BIOS code.

Power supply voltage and current requirements are a critical example of the differences between CPUs. If a CPU cartridge is plugged into a motherboard which does not contain the proper power supply regulation (called a voltage regulator module or VRM 116), damage to the CPU cartridge and/or the motherboard may result. In addition, if there are multiple CPUs installed in the system, it is possible to have conflicting voltage input requirements. If a system is powered-on in this state, damage to the motherboard VRMs and the CPU cartridges can occur. GIG PAL 110 can also check these lines to ensure that the power requirements for all of the installed CPUs are compatible with each other. The proper state of this GIG PAL input indicates that each of the installed CPU cartridges are supported by the motherboard VRMs and are compatible with each other.

Power supplies used in current PC systems often contain multiple cables that attach to the motherboard of the system. These cables often contain a replication of some of the voltages contained in the other motherboard cables. The replication is done to provide a path for additional current to flow from the power supply to the motherboard. If only a subset of these connectors is plugged into the motherboard, the required voltages may be present, but the required currents will not be available. The system may have enough current to start operation, but may fail at a later time during a more power-intensive operation. To check that all power cables are properly plugged into their respective motherboard connectors, a logic-level line is routed through each of these connectors. If any of the connections are missing, the line will be open-circuited and will be detected by the GIG PAL. The proper state of this GIG PAL input indicates that all of the all power cables are properly plugged into their respective motherboard connectors.

Computer systems are often partitioned into a main system board (motherboard) and several daughter cards. An example of one of these daughter cards is a memory expansion card 118. This partitioning of the system components allows for flexibility in the system makeup, and facilitates the mechanical packaging of the systems. If any of these daughter cards are missing or improperly installed, a partial or complete system failure may occur. If this is a partial failure, it may be transparent to the user and result in unknown loss of data integrity. To check that all of the daughter cards are properly plugged into their respective motherboard connectors, a logic-level line is routed through each of these connectors. If any of the connections are missing, the line will be open-circuited and will be detected by the GIG PAL. The proper state of this GIG PAL input indicates that all of the all daughter cards are properly plugged into their respective motherboard connectors.

As with the cables that attach to the motherboard for other components, the power supplies used in current PC systems often contain multiple cables that contain a replication of some of the voltages contained in other power cables, routed to different subassemblies, to provide a path for additional current flow. If only a subset of these connectors is plugged into their proper cards, the required voltages may be present, but the required currents will not be directly available. The system may not have sufficient current available to power-on and start operation. Also, the system may have enough current to start operation, but may fail at a later time during a more power-intensive operation. This failure may even be destructive, as the various daughter cards attempt to draw current through smaller, lower-current rated connections from other subassemblies, or through attached semiconductor devices. To check that all power cables are properly plugged into their respective daughter card connectors, a logic-level line is routed through each of these connectors. If any of the connections are missing, the line will be open-circuited and will be detected by the GIG PAL. The proper state of this GIG PAL input indicates that all of the all power cables are properly plugged into their respective daughter card connectors.

Several of the current CPU designs use an on-chip voltage regulator (OCVR), contained in the CPU cartridge, to regulate the required CPU voltages. These OCVRs provide a regulated voltage at a location much closer to the actual CPU semiconductor device contained in the CPU cartridge. This closer location provides for a better operational speed performance for the CPU. The CPU cartridges containing OCVRs contain an output logic-level line that indicates the OCVR is operating in the required range (Power-Good). When using this type of OCVR for voltage regulation, the motherboard VRMs are not required for the given CPU voltage. It is necessary that the CPU voltage be regulated in one or the other of these OCVR/VRM devices. To check that the proper regulation device has been installed (either an OCVR on the CPU Cartridge or a VRM on the motherboard), the associated power-good logic-level signal lines are routed to the GIG PAL. The CPU voltage identification (VID) lines can also be used for this power regulation differentiation. The proper state of this GIG PAL input indicates that either an OCVR or a motherboard VRM has been installed and is operating within it's specified range.

Additional features may be provided by the present invention, such as ensuring that the order of the CPUs is correct. In some systems, the slot designated for a first CPU (slot CPU 0) must always be populated, while use of other CPU slots is optional. These systems may not operate properly if only a second slot (slot CPU 1) is populated without also populating the first slot (i.e., if there is only a terminator card in slot CPU 0). GIG PAL 110 may accordingly be further programmed to check population order for these implementations.

The present invention thus provides many unique benefits. Not only is system checking allowed before the power-on sequence, but this checking extends to subassemblies, cables, etc. These checks accordingly prevent operation of the computer system in an undefined, possibly damaging state. Moreover, the device can be implemented to leverage existing structures and building blocks in existing PC designs.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the present invention has been disclosed in a desktop computer (PC) embodiment, it is equally applicable to other types of computers such as network computers (NCs), servers, workstations, minicomputers and mainframes. It is therefore contemplated that such modifications can be made without departing from the spirit or scope of the present invention as defined in the appended claims.

What is claimed is:

1. A method of controlling the power-on of a computer system, comprising the steps:
   providing a plurality of monitor lines to respective components of the computer system;
   interconnecting the monitor lines to a logic control circuit;
   monitoring the monitor lines using the logic control circuit in response to a power-on reset signal;
   executing a system power-on sequence in response to a determination by the logic control circuit that the components of the computer system are functioning properly; and
   wherein:
      the computer system has a plurality of CPU sockets which may receive a system CPU or a terminator cartridge; and
      the logic control circuit determines that one of the system CPUs or terminator cartridges is plugged into each of the CPU sockets.

2. The method of claim 1, wherein the logic control circuit further determines that a properly matched CPU cartridge has been installed into the system.

3. The method of claim 2, wherein the logic control circuit further determines that multiple CPUs contain compatible power supply requirements.

4. The method of claim 1, wherein:
   the computer system has a main power supply and a system motherboard; and
   the logic control circuit determines that the main power supply has been properly connected to the system motherboard.

5. The method of claim 4, wherein:

the computer system further has a plurality of daughter cards that interconnect with the system motherboard; and the logic control circuit further determines that all of the daughter cards are properly installed.

6. The method of claim 5, wherein the logic control circuit further determines that power supply connections to the daughter cards have been properly installed.

7. The method of claim 1, wherein:

the computer system includes a power regulator; and the logic control circuit determines that the power regulator is functioning properly.

8. A computer system comprising:

a plurality of components including at least one central processing unit (CPU);

bus means for interconnecting said components;

a plurality of monitor lines respectively connected to said components;

logic control means for monitoring the monitor lines in response to a power-on reset signal, said logic control means further executing a system power-on, sequence in response to a determination that said components of the computer system are functioning properly; and wherein:

said components include a plurality of CPU sockets which may receive a system CPU or a terminator cartridge; and said logic control means determines in a designated order that one of said system CPUs or terminator cartridges is plugged into each of said CPU sockets.

9. The computer system of claim 8, wherein said logic control means further determines that a properly matched CPU cartridge has been installed into the system.

10. The computer system of claim 9, wherein said logic control means further determines that multiple CPUs contain compatible power supply requirements.

11. The computer system of claim 8, wherein:

said components further include a main power supply; and said logic control means determines that said main power supply has been properly connected to a system motherboard.

12. The computer system of claim 11 wherein:

said components further include a plurality of daughter cards that interconnect with said system motherboard; and said logic control means further determines that all of said daughter cards are properly installed.

13. The computer system of claim 12, wherein said logic control means further determines that power supply connections to said daughter cards have been properly installed.

14. The computer system of claim 8, wherein:

said components further include a power regulator; and said logic control means determines that said power regulator is functioning properly.

* * * * *